May 5, 1964

D. A. DYMSKI ETAL 3,132,208

ELECTRONIC STETHOSCOPE

Filed June 22, 1961

INVENTORS
DONALD A. DYMSKI
JOSEPH M. SOLOMON

BY Beau, Brooks, Buckley + Beau.

ATTORNEYS

May 5, 1964

D. A. DYMSKI ETAL 3,132,208

ELECTRONIC STETHOSCOPE

Filed June 22, 1961

INVENTORS
DONALD A. DYMSKI
JOSEPH M. SOLOMON
BY
Beau, Brooks, Buckley + Beau.
ATTORNEYS May 5, 1964  D. A. DYMSKI ETAL  3,132,208
ELECTRONIC STETHOSCOPE
Filed June 22, 1961

INVENTORS
DONALD A. DYMSKI
JOSEPH M. SOLOMON
BY
*Beau, Brooks, Buckley + Beau.*
ATTORNEYS INVENTORS
DONALD A. DYMSKI
JOSEPH M. SOLOMON
BY
Beau, Brooks, Buckley & Beau,
ATTORNEYS May 5, 1964

D. A. DYMSKI ETAL 3,132,208

ELECTRONIC STETHOSCOPE

Filed June 22, 1961

INVENTORS
DONALD A. DYMSKI
JOSEPH M. SOLOMON
BY
Beau, Brooks, Buckley & Beau,
ATTORNEYS May 5, 1964

D. A. DYMSKI ETAL 3,132,208

ELECTRONIC STETHOSCOPE

Filed June 22, 1961

INVENTORS
DONALD A. DYMSKI
JOSEPH M. SOLOMON
BY
Beau, Brooks, Buckley & Beau,
ATTORNEYS May 5, 1964     D. A. DYMSKI ETAL     3,132,208
ELECTRONIC STETHOSCOPE
Filed June 22, 1961     9 Sheets-Sheet 9

INVENTORS
DONALD A. DYMSKI
JOSEPH M. SOLOMON
BY
Beau, Brooks, Buckley & Beau.
ATTORNEYS United States Patent Office 3,132,208
Patented May 5, 1964

3,132,208
ELECTRONIC STETHOSCOPE
Donald A. Dymski, Eggertsville, and Joseph M. Solomon, Lockport, N.Y., assignors to Bell Aerospace Corporation, Wheatfield, N.Y.
Filed June 22, 1961, Ser. No. 118,837
3 Claims. (Cl. 179—1)

This invention relates to electronic stethoscopes and more particularly to the combination in an electronic system of such a stethoscope with means to remove undesired sounds so that other sounds can be amplified, studied and/or recorded without interference from the undesired sounds.

It is a principal object of this invention to provide an improved and simplified system for use in the diagnosis and treatment of bodily conditions, which system not only provides electronic amplification of sounds to increase their strength and thereby facilitate analysis of their significance, but also provides means for eliminating certain sounds without weakening other sounds so that electronic amplification can be used to full advantage during observation of the latter.

The system will be described with reference to the enhancement of cardiovascular sounds, although its usefulness is by no means limited thereto, and detailed examples will be discussed hereinafter to show how the present system employs time basis filtering to remove undesired sounds so that other sounds can be amplified, studied and/or recorded without interference from the undesired sounds.

Present-day electronic equipment used in connection with this type of medical analysis is quite complex, bulky, and quite often available only in larger hospitals, such complex equipment generally being restricted to use by specially trained personnel. The present invention is designed to eliminate the need for electronically trained personnel and to allow a physician to use this device directly to obtain first-hand information from audible signals important in connection with diagnoses. Such physician can not only obtain his own information concerning the internal sounds from a patient's body, but permanent records can also be conveniently recorded and maintained by such physician over a period of time so as to make these records available if wanted at a later date, for purposes of comparison with the patient's condition at such later time. This apparatus also has great utility in the training of medical students.

The technique of filtering out cardiovascular sounds on a real-time basis is accomplished by the present invention in two different ways. One way consists of utilizing the phonocardiogram signal directly, whereas the other approach uses electrocardiograph signals to control electronic gate means connected to the phonocardiogram signal so as to obliterate unwanted sounds occurring at instants of time bearing a fixed relationship with respect to such electrocardiographic signals.

The specific equipment and techniques involved in performing the aforementioned analyses can be best illustrated by first describing the spectrum of the heartbeat. The first occurrence is not audible, but comprises an electric signal which can be picked up as a pulse by electrocardiographic circuits. This signal initiates the heart activity which comprises two dominant sounds, the first sound occurring with the apex impulse and corresponding with the beginning of the ventricular systole. This first sound is followed by a second sound which occurs after the systole and marks the beginning of the ventricular diastole. The first sound is generally louder than the second sound, and is sometimes followed by other sounds indicating heart abnormalities often referred to as "murmurs." The murmurs probably are at a still smaller amplitude, and may be somewhat overshadowed by the louder ventricular sounds.

It is an important object of this invention not only to provide means for amplifying the various sounds, but also to provide means for selecting and/or filtering out the louder sounds, such as the normal heartbeats comprising the above described sounds occurring at the time of the ventricular systole and the ventricular diastole. For purposes of illustration, the diastolic murmur condition will be used to further depict the specific technique employed in selecting only that portion of the spectrum of the heartbeat where this murmur occurs, and for purposes of simplification the above-mentioned sound occurring at the beginning of the ventricular systole will be referred to as dominant I sound of the heart, and the second sound occurring at the beginning of the ventricular diastole will be referred to as the dominant II sound of the heart.

Other objects and advantages of this invention will become apparent during the following discussion of the drawings, wherein.

Figure 1:
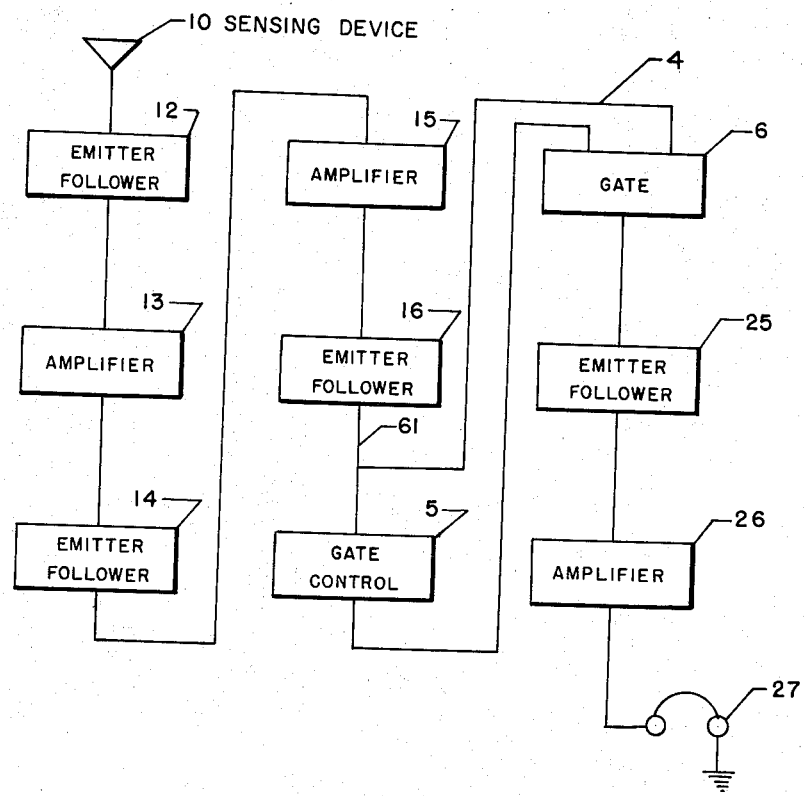
FIG. 1 is a block diagram of an electronic stethoscope employing time basis filtering.
Figure 2:
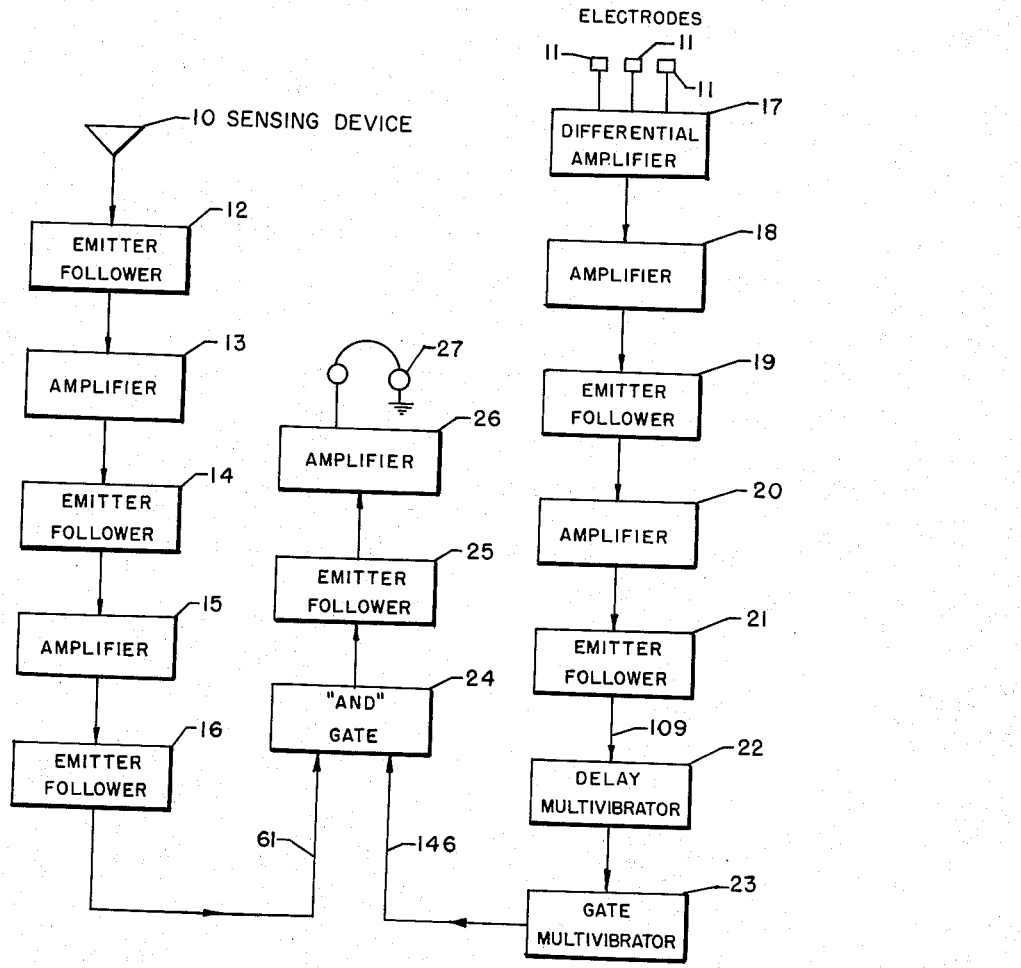
FIG. 2 is a block diagram of a system combining an electronic stethoscope with electrocardiographic equipment to provide a system in which electrical impulses serve to control the filtering of the audible sounds picked up by the stethoscope microphone.

Referring now both to FIGS. 1 and 2, as shown in each, the heartbeat or other bodily sound is detected by an appropriate sensing device such as a crystal microphone 10 and is introduced into an emitter-follower circuit 12 which serves as an impedance matching device for matching the higher impedance of the microphone 10 to the lower impedance of the following amplification means. Preferably, such amplification means comprises the amplifiers 13 and 15 having an additional emitter-follower stage 13 interposed therebetween for the purpose of improving the impedance match therebetween, and followed by a further emitter-follower 16, as shown. At any rate, it is desirable that the output of the amplification means be fed into an emitter-follower stage such as the emitter-follower stage 16 which serves as the output of the amplification system in general. The sole function of the stages mentioned so far is amplification as distinguished from filtering, etc. If the electronic stethoscope were useful merely to increase the amplitude of the detected sounds, it would only be necessary to provide a loud speaker or earphones at the output of the stage 16. The circuitry of the system as thus far described may be used in common with both the systems of FIGS. 1 and 2. According to the system of FIG. 1, a gate circuit 6 is provided to which the output of the emitter-follower 16 is coupled by way of line 4, and the conductivity of this gate 6 is determined by a control circuit 5. The output of the gate 6, if any, is then delivered to an emitter-follower 25 and an amplifier 26 which in turn comprises the listening device represented in FIG. 1 by earphones 27. Means are provided for rendering the gate control 5 inoperative, as will be discussed hereinafter in greater detail.

Referring to FIG. 2, in contrast to the system of FIG. 1 wherein the gate control 5 is connected to the emitter-follower 16, the gate control of FIG. 2, comprising the delay multivibrator 22 and the gate multivibrator 23, is connected to electrocardiographic equipment. The gate 24 controls the flow of the signal from the microphone 10 and the amplifiers 12, 13, 14, 15 and 16 to a final amplifier 26 which is coupled with the gate 24 by an emitter-follower 25. Finally, the signal from the amplifier 26 is delivered to some sort of audio transducer such as a loud speaker, or headphones 27, or some other device which may provide an audible and/or a visual record. On the right side of FIG. 2, a differential amplifier 17 amplifies the signals picked up by cutaneous electrodes 11, in a manner well known per se, and delivers its signal to a first amplifier stage 18 coupled by an emitter-follower 19 to a second amplifier stage 20 which is in turn coupled with a delay multivibrator 22 by an emitter-follower 21. The delay multivibrator 22 in turn is coupled with a gate control multivibrator 23, the output of which is delivered to the gate 24 and controls the gate to either pass or reject the amplitude sound signals from the microphone 10.

Figure 9:
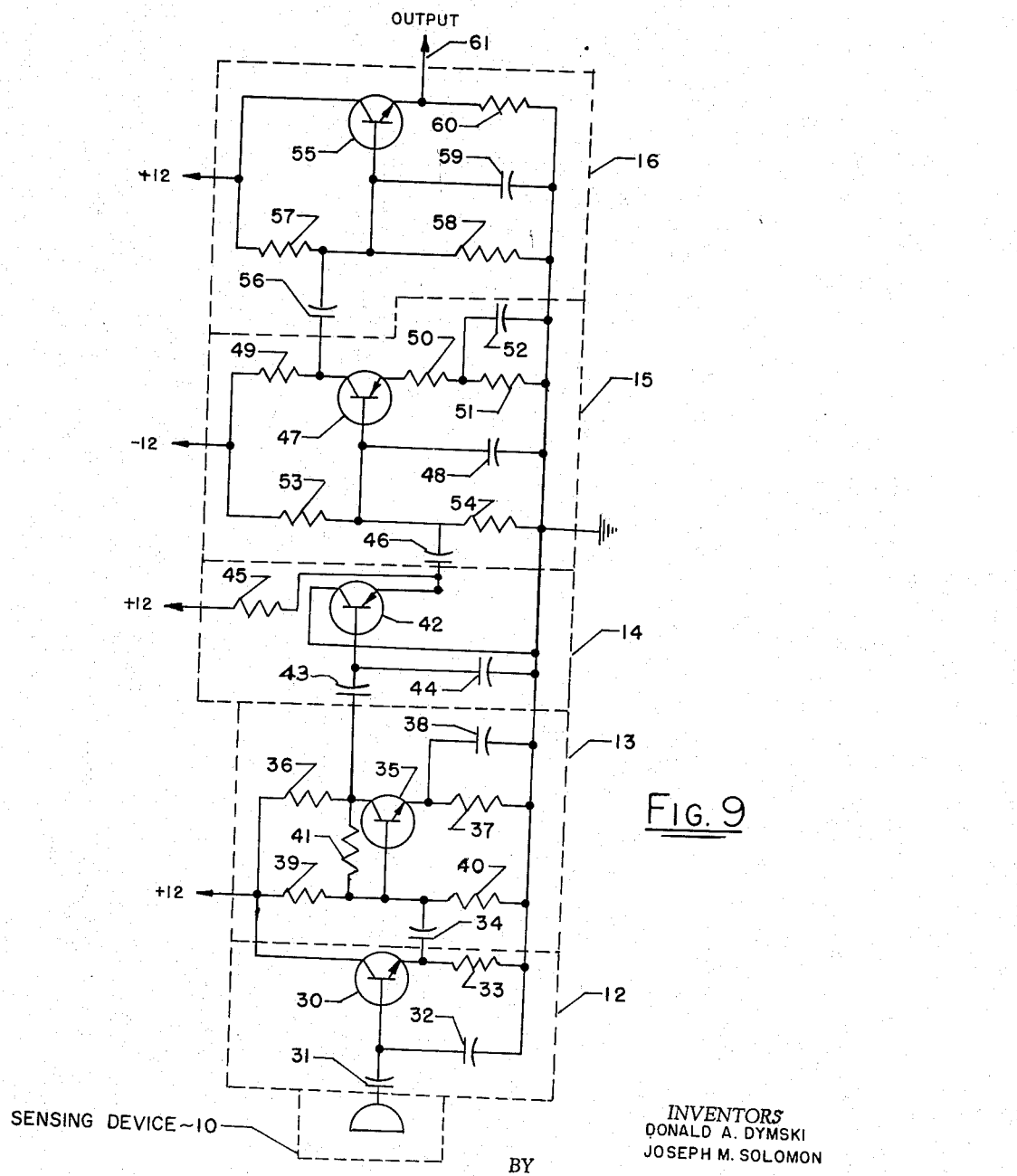
FIG. 9 is a schematic circuit diagram showing a portion of the stethoscope circuit which is common to both the system of FIG. 1 and the system of FIG. 2.

FIG. 9 shows a practical embodiment of a circuit comprising the stages 12, 13, 14, 15 and 16 as well as microphone 10, which may be used in either the system of FIG. 1 or FIG. 2. In FIG. 9, the microphone 10 is coupled with emitter-follower stage 12 including a transistor 30 having its collector returned to a source of plus voltage, and having its base coupled for alternating current with the microphone 10 by way of a condenser 31. A relatively small capacitor 32 is coupled from the base to ground to shunt any high-frequency noise component signals which might be issued from the microphone. The emitter electrode of the transistor 30 is returned to ground by a resistor 33, and the output from the emitter is connected to the next succeeding stage by a blocking capacitor 34. The emitter-follower stage 12 acts as an impedance-matching device between the microphone 10 and the first amplifier stage 13, which amplifier includes a transistor 35 having its collector coupled to the source of plus voltage through a load resistor 36 and having its emitter returned to ground through a resistance 37 bypassed by a capacitor 38 in a well known manner. The base of the transistor 35 is coupled by the condenser 34 from the emitter-follower stage 12 and a voltage divider chain including resistors 39 and 40 provides forward bias on the base of the transistor 35 to such an extent that the quiescent collector voltage is equal to about one-half of the supply voltage. An additional resistor 41 is coupled from the collector to the base for the purpose of supplying a certain amount of degenerative feedback.

The output from this amplifier stage 13 is coupled to the amplifier stage 15 through another emitter-follower stage 14 including a transistor 42 which serves to isolate the amplifier stage 13 from the amplifier stage 15. The emitter-follower transistor 42 is coupled by a capacitor 43 to the preceding amplifier stage and presents a high impedance load to the collector of that stage, a small capacitor 44 being coupled to ground thereacross in order to further filter out unwanted high frequency components. The collector of the transistor 42, which is, incidentally, of opposite conductivity type as compared with the NPN transistors 30 and 35, is returned to ground. The emitter of the transistor 42 is connected to a source of positive voltage by a load resistor 45, and the output across this resistor 45 is coupled by a capacitor 46 to the base of the next succeeding transistor comprising the amplifier stage 15.

The transistor 47 comprising the amplifier stage 15 has its base coupled to the preceding emitter-follower stage 42 by the capacitor 46 and this base is also bypassed by a small condenser 48 in order to eliminate unwanted high frequency components. Since the transistor 47 is a PNP transistor, its collector electrode is coupled to a minus source of voltage through a load resistor 49, and the emitter of this transistor is returned through two resistances 50 and 51 to ground, the latter resistance being bypassed by a condenser 52 so that the emitter circuit is only partially bypasesd, thereby permitting the unbypassed resistor 50 to provide a certain amount of degenerative feedback in the amplifier transistor 47. A chain of resistors 53 and 54 provide forward bias on the base of the transistor 47 to such an extent that the quiescent collector potential is one-half of the negative supply voltage. Finally, the output from the amplifier transistor 47 passes through an emitter-follower stage 16 including a transistor 55 coupled by a capacitor 56 to the load resistor 49 of the preceding stage, and this emitter-follower is biased somewhat in the forward direction by a chain of resistors 57 and 58. The base of the transistor 55 is again bypassed for high frequency by a small capacitor 59. Since the transistor 55 is an NPN transistor, its collector is returned to a source of positive voltage and its emitter is coupled to ground through an output load resistance 60. The output from this last emitter-follower stage 16 is taken from the load resistor 60 by a lead 61 which is coupled to the gate circuit 24, as illustrated in FIG. 2.

Figure 3:
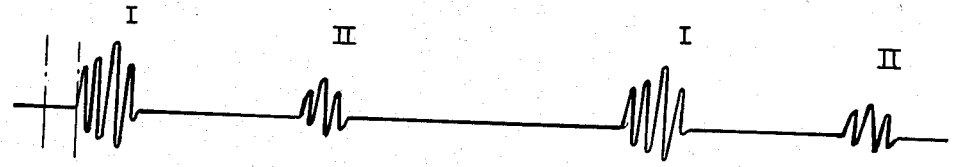
FIG. 3 is an illustration of a heartbeat signal illustrating the dominant I and dominant II sounds.
Figure 4:
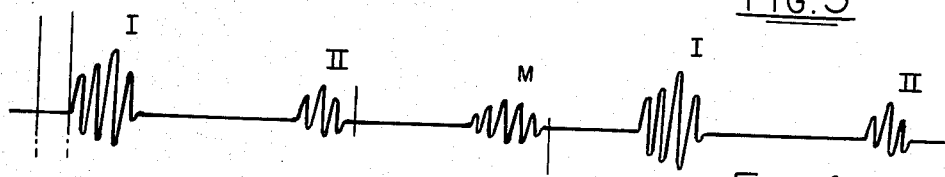
FIG. 4 is similar to FIG. 3 but showing the presence of a heart murmur.

The signals passing from the emitter-follower 16 are of the wave form of which FIGS. 3 and 4 are representative. The particular form, it will be understood, is determined by the particular heart being studied and which may or may not contain abnormalities such as the diastolic murmur M of FIG. 4.

Figure 10:
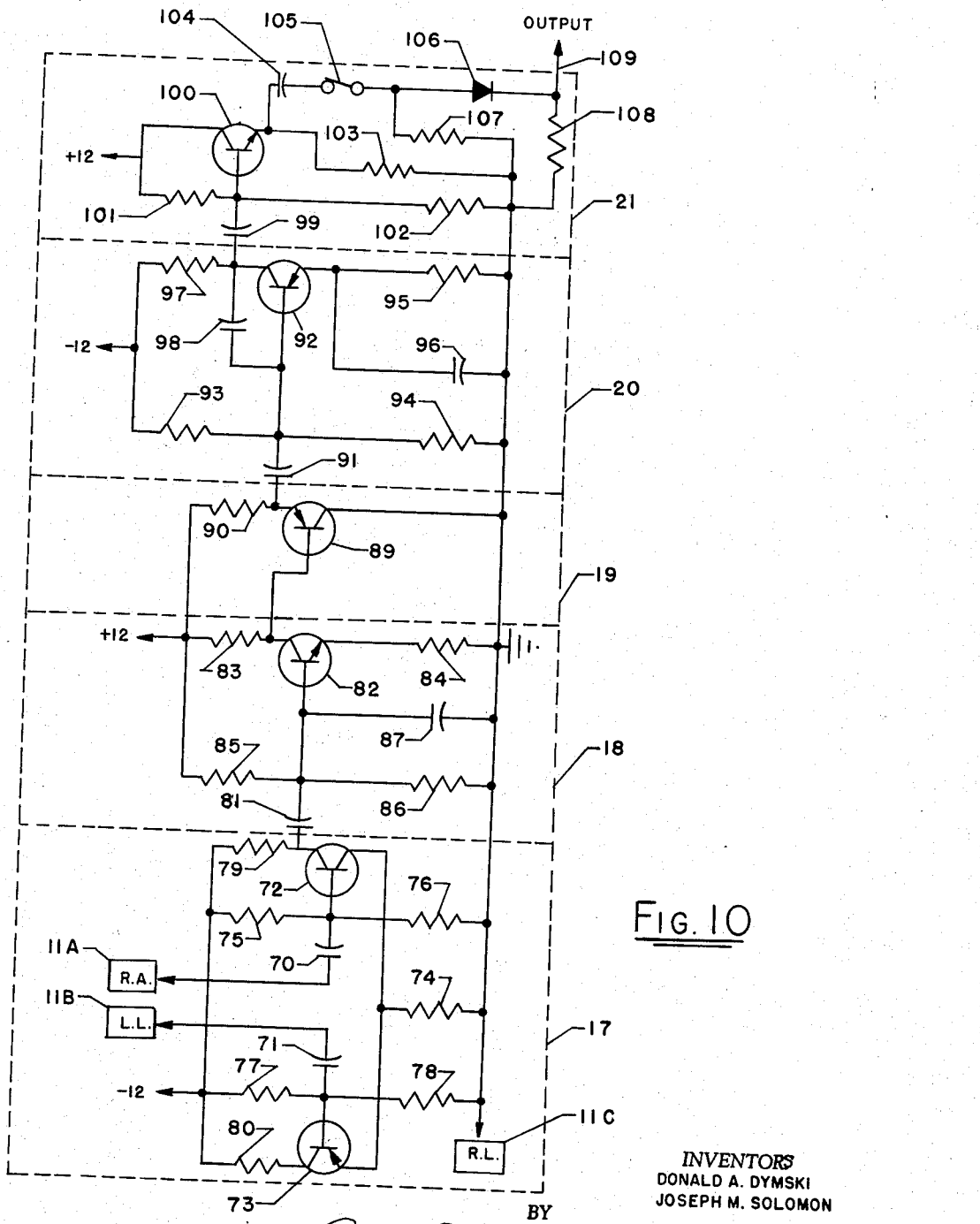
FIG. 10 is a schematic diagram of a portion of the circuit according to the system of FIG. 2.

Turning now to a discussion of the right hand column of blocks in the diagram of FIG. 2, an electrical signal, similar to that used in electrocardiographic work, is picked up from a plurality of cutaneous electrodes 11 and amplified in the amplifiers, a workable embodiment of which is shown in FIG. 10. As is well known in the electrocardiographic art, the electrodes 11 comprise an electrode 11a connected to the right arm of the patient, an electrode 11b connected to the left leg of the patient, and an electrode 11c connected to the right leg of the patient. The right leg of the patient is then connected to the ground terminal of the system, and the electrodes connected to the right arm and the left leg of the patient are then capacitively coupled through capacitors 70 and 71 to the bases of the respective transistors 72 and 73 of the differential amplifier 17. The differential amplifier transistors 72 and 73 share a common emitter resistance 74 and have their base circuits forwardly biased at the same potentials by respective resistor chains 75 and 76. The collectors of these transistors are returned to a source of negative supply voltage through load resistances 79 and 80. As a consequence of this circuit, any potential difference which exists between the electrodes 11a and 11b is amplified and coupled for alternating current signals to the base of a first electrocardiogram amplifier 18, the coupling being accomplished through a capacitor 81 connected to the base of the transistor 82. The collector of this transistor is provided with a load resistance 83, and the emitter is returned to ground by another resistor 84.

Forward bias is supplied to the base of the transistor 82 by a resistance chain comprising the resistors 85 and 86 and the base is bypassed to ground for high frequency by a small condenser 87. The bias level is set on the transistor 82 so that its quiescent collector voltage is equal to one-half of the supply voltage. Since the emitter resistance 84 is not bypassed it serves to increase the input impedance of this amplifier stage. The negative feedback also provides more stable operation, and the higher input impedance tends to minimize the load on the differential amplifier 17.

The output of this amplifier stage 18 is taken through a capacitor 88 and applied to the base of an emitter-follower capacitor 89 having a grounded collector and having a load resistance 90 connected between its emitter and the source of positive supply voltage. This emitter-follower serves to present a high impedance to the first amplifier stage 18 and the lower driving impedance to the following amplifier stage 20, the emitter-follower being coupled thereto through a capacitor 91 connected with the base of the next amplifier transistor 92. Here again, this amplifier stage 20 is bypassed by a chain of resistors 93 and 94 so that its quiescent collector voltage is one-half of the supply voltage, the emitter of this transistor being returned to ground through a resistance 95 bypassed by a condenser 96, and the collector of the transistor 92 is coupled to a source of negative voltage by a load resistor 97. A capacitor 98 is connected between the collector and the base of the transistor 92 in order to provide substantial negative feedback at the higher frequencies, but very little feedback at the lower frequencies which are of principal interest in the intended application of this amplifier. The output of this amplifier stage is then coupled by a capacitor 99 with a final emitter-follower stage 21 comprising a transistor 100 having its collector coupled to a source of positive supply voltage and having its base forwardly biased by resistors 101 and 102. The emitter of the transistor is returned to ground by a load resistance 103, and the output from this stage is coupled through a capacitor 104 to a switch 105 which is in turn coupled to a diode 106, both sides of which are returned to ground by resistors 107 and 108 respectively. The output of the amplifier system shown in FIG. 10 is taken along the wire 109 from the junction between the diode 106 and the resistance 108. The diode 106 is oriented so as to pass only positive components of the output from the emitter-follower transistor 100, and therefore the output of this amplifier comprises positive pulses. These positive output pulses can be seen in FIG. 5 and are labeled P. It is to be noted that these positive pulses occur slightly before dominant heartbeat sound I.

Figure 11:
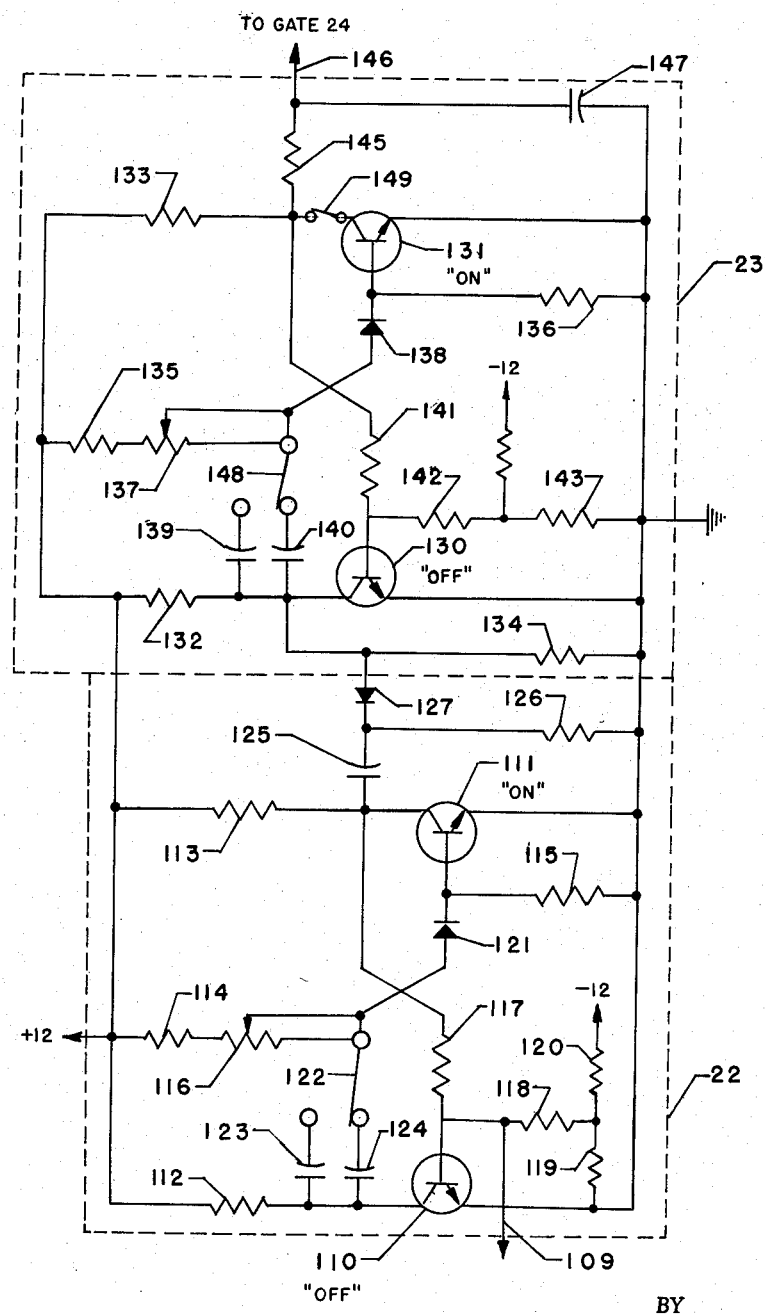
FIG. 11 is a schematic diagram of the gate control means used specifically in the system of FIG. 2.

Referring now to FIG. 11, showing a working embodiment of the delay multivibrator 22 and the gate control multivibrator 23, the delay multivibrator 22 comprises two transistors connected to provide monostable operation in which the transistor 110 is conductive. The collectors of both transistors are connected to a source of positive voltage through respective load resistors 112 and 113, and the base of transistor 111 is normally biased on by a chain of resistors 114, 115 and 116, the latter comprising a potentiometer. The base of the normally off transistor 110 is coupled through resistances 117 and 118 to a voltage divider chain 119 and 120 connected between ground and a source of negative potential, and in this manner the base of the transistor 110 is maintained nonconductive when the transistor 111 is conductive. On the other hand, if the transistor 111 becomes nonconductive, the positive voltage at the collector electrode thereof increases and thereby biases the transistor 110 positively. The input lead 109 from the preceding emitter-follower circuit 21 is applied to the base of the transistor 110 through resistor 118 and drives it positive and therefore conductive each time a positive pulse passes through the lead 109. As is well known in the prior art, a negative pulse is generated at the collector of the transistor 110 when triggered and is delivered through the diode 121 to the base of the transistor 111 to thereby cut off this transistor. A switch 122 couples one of a plurality of capacitors 123, 124 to the lower end of the potentiometer 116, and the selected one of these capacitors together with the resistance in the voltage divider chain 114—116 controls the time constant of the quasi-stable state of this multivibrator. It is to be understood that as herein used, the term "monostable vibrator" relates to a multivibrator with one stable and one quasi-stable state in which the same is normally stable and is triggered to the quasi-stable state.

By varying the potentiometer 116 and by moving the switch 122 to select an appropriate capacitor 123, 124 it is possible to vary the time constant of this multivibrator 22 and thereby vary the length of the positive output pulse G' (FIG. 5) obtained at the collector of the transistor 111. This positive output pulse is then differentiated by a capacitor 125 and a resistor 126 so as to provide a positive spike at the beginning of the positive pulse G' and a negative spike at the end of the same positive pulse. The diode 127 is coupled between the differentiating capacitor 125 and the input of the next multivibrator stage 23 so as to pass only the negative spikes onto the multivibrator 23.

The multivibrator 23 is also a monostable device in which the transistor 130 is normally off and the transistor 131 is normally on. These transistors have their collectors coupled to the source of positive power by way of resistances 132 and 133 respectively, and the transistor 130 also has its collector returned to ground by another resistor 134 which forms a voltage divider with transistor 132. The emitters of both transistors are directly returned to ground, and the base of transistor 131 is connected in a series voltage divider 135, 136 and 137, the latter resistor being a potentiometer. A series diode 138 is also connected in this circuit so as to isolate the time constant formed by the capacitors 139 and 140 together with the resistances 135 and 137 so as to prevent loading of these time constants by the base-emitter circuit of the transistor 131. The base of the other transistor 130 is also connected in a voltage divider comprising the resistors 141, 142, 143 connected between ground and the collector of the transistor 131, and negative bias is injected into this chain by way of a resistance 144 so as to insure that the transistor 130 will normally remain cut off so long as the transistor 131 is conductive. This multivibrator operates in substantially the same manner as the delay multivibrator 22. The output pulse from the multivibrator 23 is delivered through a resistance 145 to a lead 146 which is also connected to one end of a capacitor 147, the other end of which is grounded for the purpose hereinafter stated. The lead 146 is then connected to the gate 24, FIG. 2, and serves to control that gate in a manner also to be hereinafter discussed.

Figure 6:
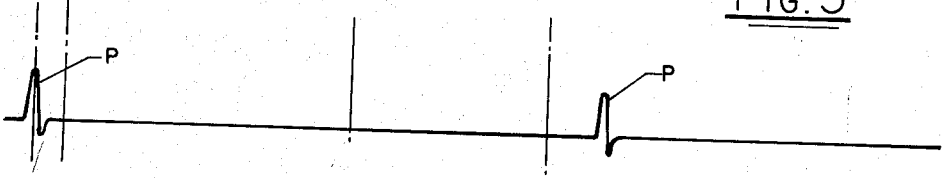
FIG. 6 is an illustration of the triggering waveform delivered to multivibrator 22 in FIG. 2.
Figure 7:
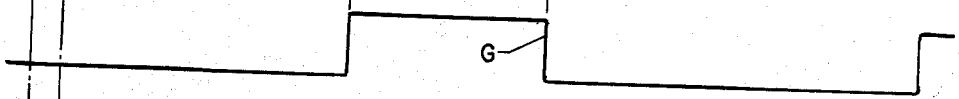
FIG. 7 is an illustration of the signal output of the gate control multivibrator 23 of FIG. 2 and showing its orientation relative to the signal of FIG. 3 or 4.
Figure 8:
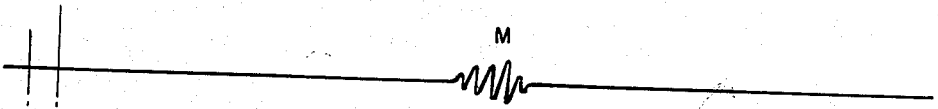
FIG. 8 is an illustration of a representative signal emanating from the gate 6 of FIG. 1 or the gate 24 of FIG. 2.

It will be seen that when a negative spike is delivered from the diode 127 to the base of the transistor 131, which is normally conductive, this latter transistor is cut off and the time constant comprising one of the condensers 139, 140 and the resistors 135 and 137 is charged up so that the transistor 130 is turned on for the duration of this time constant. Since during this quasi-stable state the transistor 131 is cut off, the collector thereof will be driven positive, and therefore a positive pulse will be delivered through the lead 146 for the duration of the time constant of the multivibrator 23. As stated above, the positive pulse at the collector of transistor 111 is differentiated by capacitor 125 and 126 so as to provide a positive spike at the beginning of the pulse G' and a negative spike at the end of the same positive pulse. Since it is the negative spike which triggers the multivibrator 23 and further since the positive pulse G' at the collector of transistor 111 is coincidental with pulse P (FIG. 6), the position of the leading edge of positive pulse G (FIG. 7) from multivibrator 23 is controlled by the time constant of multivibrator 22. As a result, it will be seen that the time constant adjusted by the potentiometer 116 and the switch 122 determine the front edge of the pulse G from the multivibrator 23, and that the trailing edge of this pulse G from the multivibrator 23 is then adjusted by the appropriate selection of a capacitor 139 or 140 by changing the switch 148 to the appropriate position, and also by further adjustment of the potentiometer 137. In other words, after a range has been selected by appropriate adjustment of switches 122 and 148, fine adjustment of the leading and trailing edges of the gate pulse G, FIG. 7, is made by movement of the resistances 116 and 137. It is the pulse P from the wave form of FIG. 6 as delivered to a first multivibrator 22 by the amplifier circuit of FIG. 10 which controls the triggering of the first multivibrator circuit 22. Therefore, in the system shown in FIG. 2 the leading edge of the pulse G can be initiated at any time beginning with the occurrence of the small pulse P in FIG. 6, which small pulse represents the electrocardiogram impulse preceding the first of the dominant heartbeat sounds.

Figure 12:
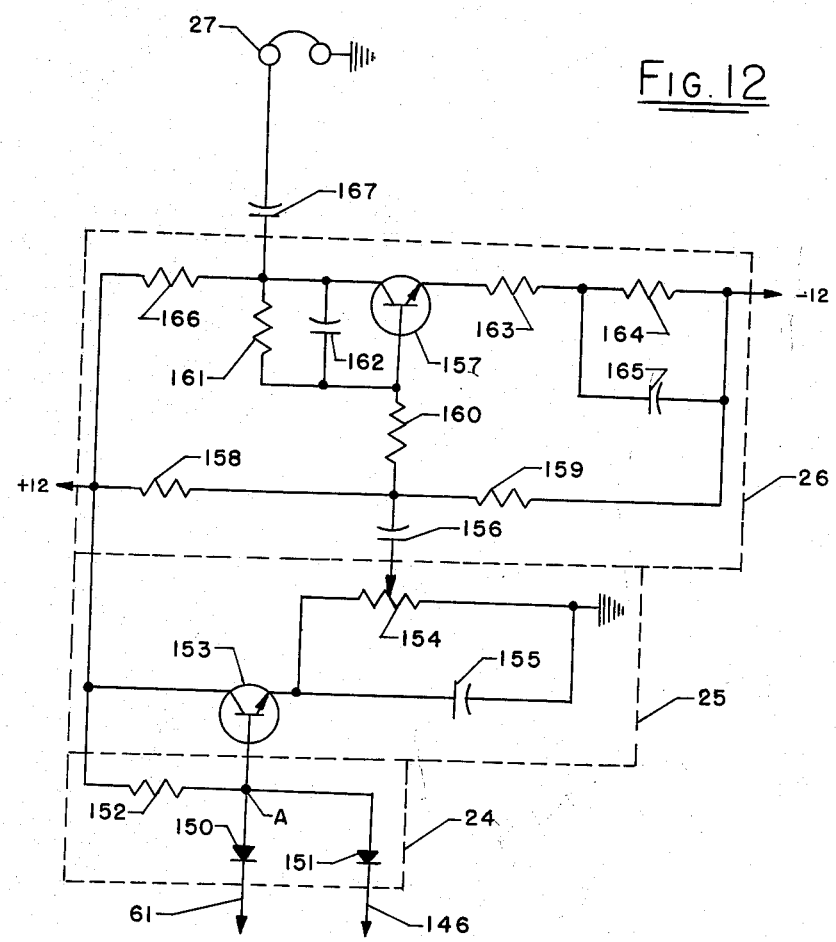
FIG. 12 is a schematic diagram of the gate and subsequent circuitry used in the system of FIG. 2.

The gate according to the system of FIG. 2 is shown in FIG. 12, wherein two diodes 150 and 151 are coupled to a common point A which is in turn connected to the base of the transistor 153 comprising the emitter-follower 25 as illustrated in FIG. 2. The other end of the diode 150 is coupled to the lead 61 which is connected from the output of the sound amplifier circuit shown in FIG. 9. The other end of the diode 151 is connected through lead 146 to the output of the multivibrator circuit 23, FIG. 11, and both diodes are biased on one side at point A to an appropriate voltage by a resistance 152 which is connected to a source of positive potential. When the normally on transistor 131 of the multivibrator shown in FIG. 11 is conductive during the interval G' in FIG. 5, it drives current through the resistance 133 and thereby lowers the voltage at the collector of the transistor 131 and also on the line 146. This voltage becomes less positive and therefore the diode 151 drives more current through the resistance 152 than would be the case if the collector of the transistor 131 stopped drawing current and the voltage at its collector went to the full plus 12 volts. In this latter case, the diode 151 would draw no current through the resistance 152 and therefore point A would become much more positive. By appropriate selection of the quiescent voltage appearing at the line 61 which is the emitter of the transistor 55, the diode 150 can be selectively biased conductive, or nonconductive, depending on whether collector current is drawn through the transistor 131. As stated above, in the quiescent state, such current is normally drawn, and therefore the diode 150 is normally biased nonconductive. Thus, during the quasi-stable state of the multivibrator 23, a positive gate voltage G, FIG. 7, is applied to the diode 151 and the presence of this positive voltage permits the audio signals to pass through the gate from the lead 61 to the emitter follower 25. On the other hand, when the gate signal G is not present, during G' intervals in FIG. 5, the diode 151 conducts current through the resistor 152 to a sufficient extent that the diode 150 becomes reverse-biased and therefore the gate is rendered nonconductive.

The resistor 145 and the capacitor 147 in FIG. 11 comprise an integration circuit which serves the purpose of rounding the leading and trailing edges of the pulse G so as to prevent the introduction of switching transients thereby. In FIG. 11, a switch 149 is provided which, when opened, renders the collector circuit of the transistor 131 nonconductive, and thereby raises the positive voltage at the lead 146 to render the diode 151 nonconductive, and thereby render the diode 150 conductive. In other words, when the switch 149 is opened the gate is made continuously conductive and all of the sound signals from the amplifier illustrated in FIG. 9 pass through to the headphones 27.

The emitter-follower 25 has its collector returned to the source of positive potential and has its emitter returned to ground through a potentiometer 154 which is bypassed by a small condenser 155 which serves to eliminate high frequency components of the signal passing through the amplifier 153. The output from the emitter-follower 25 is delivered through a capacitor 156, and the amplitude of the signal therethrough is adjustable by adjustment of the potentiometer 154.

The audio signal is fed from the capacitor 156 to the base of the transistor 157 which comprises the final amplifier 26, the base being forwardly biased by a voltage divider chain comprising the resistors 158 and 159. This final amplifier 26 is biased to allow a dynamic negative swing of approximately 10 volts in amplitude without saturation. The resistor 160, connected in series with the base of the transistor 157, tends to limit the driving signal and thereby minimize saturation tendencies. Collector to base feedback through resistor 161 and capacitor 162, and the use of an unbypassed resistor 163 in the emitter circuit provide degenerative feedback and stabilize the operating point of this amplifier. Only part of the emitter circuit is unbypassed, the resistor 164 being bypassed by a condenser 165. The amplifier transistor 157 is provided with a load resistor 166 which is coupled to the source of positive potential, and the output signal to the earphones 27, or other output transducer, is provided through a coupling capacitor 167.

Figure 14:
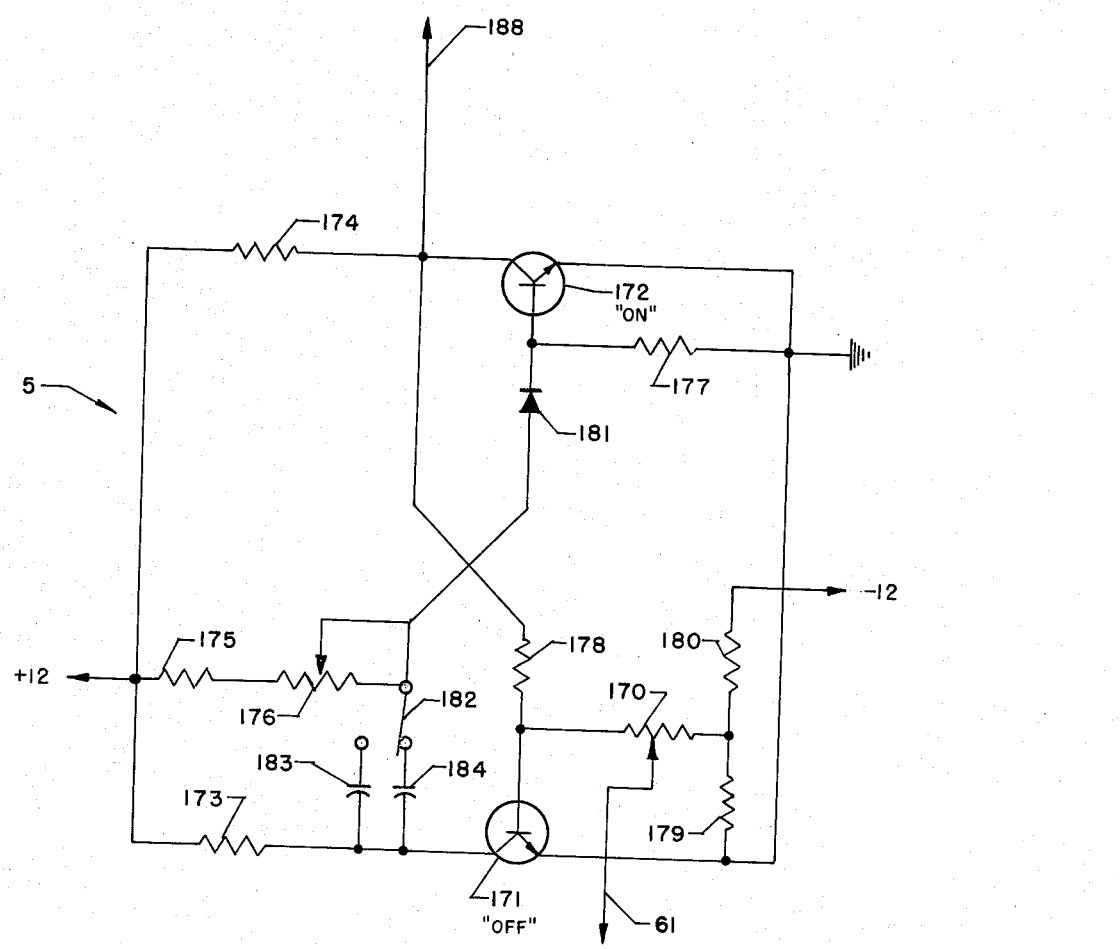
FIG. 14 is a schematic diagram of the gate control 5 of FIG. 1.

In the system of FIG. 1, the gate control 5 comprises a delay multivibrator as is illustrated in FIG. 14. In this latter figure, the output of the amplifier system of FIG. 9 is connected thereto as at 61 and leads to a potentiometer 170. The multivibrator 5 comprises two transistors 171 and 172 connected to provide monostable operation in which transistor 171 is normally off and transistor 172 is normally on. The collectors of both transistors are connected to a source of positive voltage through respective load resistors 173 and 174, the base of transistor 172 is normally biased by a chain of resistors 175, 176 and 177, of which 176 is a potentiometer. The base of transistor 171 is coupled through resistance 178 and the resistance of potentiometer 170 to a voltage divider chain comprises resistors 179 and 180 connected between ground and a source of negative voltage as shown. In this fashion, the base of transistor 171 is maintained nonconductive when transistor 172 is conductive. On the other hand, if transistor 172 becomes nonconductive, the positive voltage at the collector electrode thereof increases and thereby biases the transistor 171 positively. Every time a positive pulse I (FIG. 3) is applied to the base of transistor 171 through lead 61 to the potentiometer 170, the transistor 171 is driven positive. The negative pulse generated at the collector of transistor 171 is delivered through diode 181 to the base of transistor 172 to thereby cut off this transistor. Switch 182 selectively couples one of the capacitors 183, 184 . . . to the resistance of potentiometer 176 and the selected one of these capacitors together with resistors 175 and 176 determine the time constant of the quasi-stable state of transistor 172.

Figure 13:
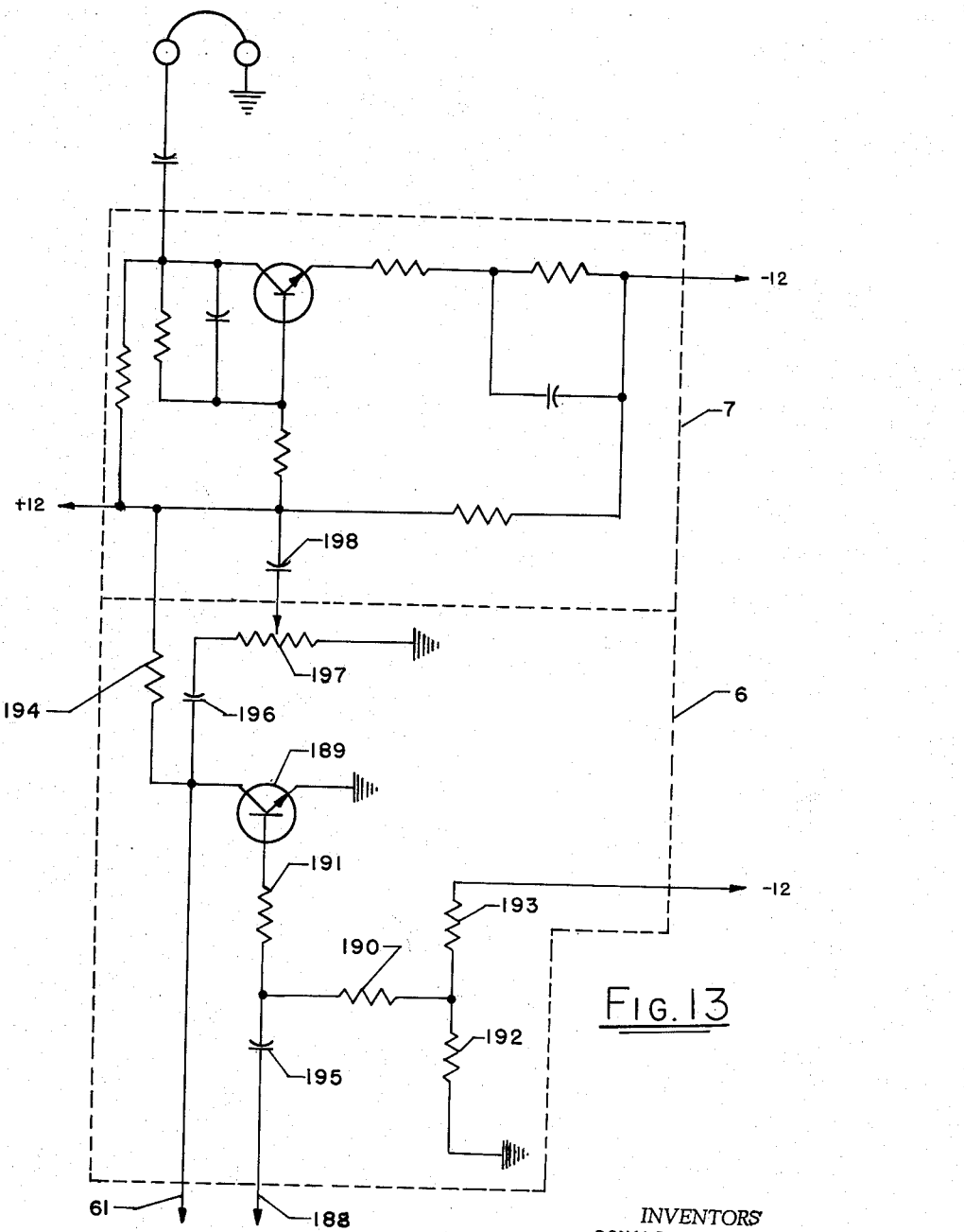
FIG. 13 is a schematic diagram of the gate and subsequent circuitry used in the system of FIG. 1.

FIG. 13 illustrates the circuit of the inhibitor gate 6 of FIG. 1 as well as the amplifier 7 of that same figure. In the gate 6, the base of transistor 189 is negatively biased by resistors 190 and 191 connected to the voltage divider chain comprising resistors 192 and 193 while its collector is connected to a source of positive voltage by load resistor 194. The gate 6 is coupled to the gate control 5 (FIG. 14) by the capacitor 195 through conductor 188. The collector of transistor 189 is connected to emitter-follower 22 by conductor 61 and thus receives the amplified heartbeat sound signals therefrom. Thus, the heartbeat signal is always present at the collector of transistor 189 and due to the negative bias on the base of transistor 189, this signal will continue unimpeded to capacitor 196 and potentiometer 197. However, when the positive going wave form from the gate control multivibrator appears at 188, transistor 189 becomes heavily forward biased which causes the collector to emitter impedance to become very low, shortening the heartbeat signal at the collector to ground.

The amplifier 7 is coupled to potentiometer 197 by capacitor 198 which coresponds to capacitor 156 in FIG. 12. The remaining circuit components of the amplifier 7 in FIG. 13 also correspond to their counterparts in the amplifier 26 in FIG. 12 and further description thereof is not deemed necessary.

Figure 5:
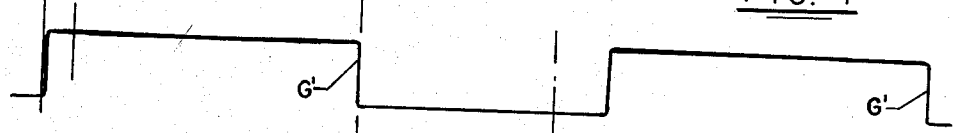
FIG. 5 is an illustration of the signal output of the gate control 5 of FIG. 1 and showing its orientation relative to the signal of FIG. 3 or 4.

Relating back to FIGS. 3–8 and describing operation of the device in conjunction with the form of the invention shown in FIG. 2, the sound signals of the heart are as shown in FIGS. 3 and 4, the latter figure showing the presence of a murmur M. FIG. 5 illustrates the pulse G′ which is generated by the multivibrator 22 as triggered by the pulse P, FIG. 6, which is the electrical impulse preceding the dominant I sound of FIGS. 3 and 4. Thus, the pulse P is present at the multivibrator 22 through the conductor 109 (FIG. 11) and this triggering pulse P for the multivibrator 22 causes the pulse G′ to be present at the capacitor 125, the duration of the pulse G′ being dictated by the time constant involved in conjunction with the multivibrator 22 as aforesaid and which may be varied if desired. The capacitor 125 and resistance 126 differentiate the pulse G′ to produce a positive spike at the leading edge of the pulse G′ and a negative spike at the trailing edge of the pulse G′. Due to the orientation of the diode 127, it is the negative spike at the trailing edge of the pulse G′ which triggers the gate multivibrator 23 whose output is depicted in FIG. 7 of the drawings. Thus, the leading edge of pulse G of the multivibrator 23 is coincidental with the trailing edge of the pulse G′ of the delay multivibrator 22. The duration of pulse G is determined by the time constant of the multivibrator 23 as aforesaid and may be varied if desired.

The gate 24 of FIG. 12 receives both the signal from the microphone through conductor 61 and the signal from the gate multivibrator 23 through the conductor 146 and such gate 24 is operative to pass the heartbeat sound signals only at such time as the pulse G of FIG. 7 is present. Thus, in the specific example shown in FIGS. 4–8, only the murmur M will be passed onto the emitter-follower 25 and ultimately to the sound reproducer means 27 in FIG. 12. Thus, the gate control in accordance with the invention as shown in FIG. 2 includes a delay multivibrator triggered by pulse P of FIG. 6 and generating a pulse whose duration is controlled or predetermined to produce the pulse G′ of FIG. 5 and such control means also includes the gate control multivibrator 23 which generates a pulse G of predetermined duration which is triggered in response to the trailing edge of pulse G′ to so control the gate 24 as to pass the heartbeat sounds only at such times as the pulse G is present.

In contrast to the above, the operation of the invention according to FIG. 1 embodies a more simplified gate and gate control means in accordance respectively with FIGS. 14 and 13 of the drawings. The gate control 5 in FIG. 14 receives signals through the conductor 61 directly from the sound pickup means and in accordance with the circuitry involved, including the threshold potentiometer 170, the output of the gate control 5, through conductor 188 is a pulse of predetermined and preferably variable duration which is initiated by the dominant I heartbeat sound. This pulse is passed onto the gate 6 of FIG. 13 and whenever such pulse is present at the conductor 188, the transistor 189 is rendered conductive so that the heartbeat sound signals present at the conductor 61 are shorted to ground. Otherwise such signals will pass onto the amplifier 7 of FIG. 13, corresponding to the amplifier 26 of FIG. 2.

Although the output of gate control 5 is not specifically shown in the drawings, it will be appreciated that it will be of form similar to that shown in FIG. 5 (pulse G′). However, as previously mentioned, unlike pulse G′ which is triggered by pulse P of FIG. 6, the output of gate control 5 is triggered by the dominant I heartbeat sounds. Thus, successive output pulses of gate control 5 will be separated by an interval whose duration determines each period of sound between successive dominant I heartbeats. Thus, gate 6 differs basically from gate 24 in that the latter is normally nonconductive and is rendered conductive by gate control 22–23, whereas gate 6 is normally conductive and is rendered nonconductive by gate control 5.

To illustrate one specific embodiment of the present invention according to FIGS. 2 and 9–12, the following circuit values apply to the latter figures.

*FIGURE 9*

| | |
|---|---|
| 30—2n585 | 46—10 µf. |
| 31—15 µf. | 47—2n404 |
| 32—.022 µf. | 48—.022 µf. |
| 33—56K | 49—10K |
| 34—6 µf. | 50—100 ohms |
| 35—2n585 | 51—680 ohms |
| 36—10K | 52—45 µf. |
| 37—510 ohms | 53—1M |
| 38—45 µf. | 54—51K |
| 39—1M | 55—2n585 |
| 40—22K | 56—10 µf. |
| 41—680K | 57—100K |
| 42—2n404 | 58—56K |
| 43—10 µf. | 59—.022 µf. |
| 44—.022 µf. | 60—3.9K |
| 45—2K | |

*FIGURE 10*

| | |
|---|---|
| 70—2.0 µf. | 90—2K |
| 71—2.0 µf. | 91—22 µf. |
| 72—2n404 | 92—2n404 |
| 73—2n404 | 93—330K |
| 74—6.8K | 94—10K |
| 75—330K | 95—100 ohms |
| 76—22K | 96—45 µf. |
| 77—330K | 97—6.2K |
| 78—22K | 98—.05 µf. |
| 79—7.5K | 99—22 µf. |
| 80—7.5K | 100—2n585 |
| 81—22 µf. | 101—220K |
| 82—2n585 | 102—56K |
| 83—15K | 103—3.9K |
| 84—100 ohms | 104—20 µf. |
| 85—510K | 106—1n198 |
| 86—15K | 107—56K |
| 87—.022 µf. | 108—100K |
| 89—2n404 | |

*FIGURE 11*

| | |
|---|---|
| 110—2n585 | 130—2n585 |
| 111—2n585 | 131—2n585 |
| 112—5.1K | 132—5.1K |
| 113—6.8K | 133—6.8K |
| 114—10K | 134—51K |
| 115—39K | 135—10K |
| 116—100K | 137—100K |
| 117—20K | 138—1n198 |
| 118—10K | 139—2 µf. |
| 119—1K | 140—10 µf. |
| 120—12K | 141—20K |
| 121—1n198 | 142—10K |
| 123—.25 µf. | 143—1K |
| 124—3.5 µf. | 144—12K |
| 125—0.1 µf. | 145—1K |
| 126—22K | 147—.001 µf. |
| 127—1n198 | |

FIGURE 12

150—1n198
151—1n198
152—56K
153—2n585
154—5K
155—.47 μf.
156—10 μf.
157—2n585
158—56K

159—33K
160—10K
161—220K
162—.0047 μf.
163—2K
164—10K
165—45 μf.
166—10K
167—2.0 μf.

While a preferred embodiment of the invention has been shown, the inventive principles involved are capable of assuming other physical embodiments without departing from the spirit of the invention and the scope of the appended claims.

What is claimed is:

1. An electronic stethoscope system responsive to body sounds and electrical impulses, comprising a microphone for picking up body sounds, sound signal amplifier means connected with the microphone and delivering electrical signals proportional thereto, sound reproducing means, signal gate means coupling said amplifier means to said reproducing means, said gate means selectively controlling the passage of said signals therethrough, electrode means for picking up body impulses, impulse amplifier means coupled with said electrode means and delivering amplified electric impulses proportional to said body impulses, and gate control means coupled to said gate means for controlling the conductivity thereof and coupled to said impulse amplifier means and actuated by amplified electric impulses to change the conductivity of the gate means, said gate control means comprising a monostable delay multivibrator coupled to be triggered by said impulses and having a first R-C time constant determining the duration of its output wave when triggered to its quasi-stable state, a monostable gate-voltage multivibrator having a second R-C time constant determining the duration of its output gate-voltage wave when triggered to its quasi-stable state, and coupling means connecting the gate-voltage multivibrator to the delay multivibrator to be triggered by the trailing edge of its quasi-stable output wave.

2. In a system as set forth in claim 1, said coupling means comprising a differentiating circuit differentiating the quasi-stable output wave of the delay multivibrator, and diode means poled to pass the differentiated signal from the trailing edge of said wave, but to block the differentiated signal from the leading edge of said wave.

3. In a system as set forth in claim 1, R-C time constant adjusting means for adjusting the duration of the gate voltage applied to the gate means when the gate-voltage multivibrator is in quasi-stable state.

References Cited in the file of this patent

UNITED STATES PATENTS

| | | |
|---|---|---|
| 2,577,827 | Tompkins | Dec. 11, 1951 |
| 2,827,040 | Gilford | Mar. 18, 1958 |
| 2,865,365 | Newland et al. | Dec. 23, 1958 |
| 3,030,946 | Richards | Apr. 24, 1962 |